US007984794B2

(12) United States Patent
Kuipers et al.

(10) Patent No.: US 7,984,794 B2
(45) Date of Patent: Jul. 26, 2011

(54) DEVICE FOR SEALING A GAP BETWEEN CAR DOOR AND CAR WALL IN AN ELEVATOR CAR

(75) Inventors: Erwin Reinder Kuipers, Udligenswil (CH); Alex Oberer, Ennetburgen (CH); Dario Augugliaro, Lucerne (CH)

(73) Assignee: Inventio AG, Hergiswil NW (CH)

( * ) Notice: Subject to any disclaimer, the term of this patent is extended or adjusted under 35 U.S.C. 154(b) by 148 days.

(21) Appl. No.: 11/710,748

(22) Filed: Feb. 26, 2007

(65) Prior Publication Data

US 2007/0170663 A1 Jul. 26, 2007

Related U.S. Application Data

(62) Division of application No. 10/730,591, filed on Dec. 8, 2003, now abandoned.

(30) Foreign Application Priority Data

Oct. 12, 2002 (EP) .................................... 02406083

(51) Int. Cl.
*B66B 13/06* (2006.01)
*E05C 17/00* (2006.01)
*E06B 7/16* (2006.01)
*F16J 15/46* (2006.01)

(52) U.S. Cl. .......... 187/334; 49/120; 49/478.1; 277/645

(58) Field of Classification Search .................. 187/334, 187/325, 400, 414; 49/466, 478.1, 480, 483.1, 49/498.1, 499, 116–120, 480.1; 277/650, 277/921, 312, 645
See application file for complete search history.

(56) References Cited

U.S. PATENT DOCUMENTS

| | | | | | |
|---|---|---|---|---|---|
| 2,104,144 | A | | 1/1938 | Zand | |
| 2,471,635 | A | * | 5/1949 | Vennice et al. | 49/478.1 |
| 2,530,160 | A | | 11/1950 | Finley | |
| 2,855,639 | A | * | 10/1958 | Korb | 49/478.1 |
| 3,100,918 | A | | 8/1963 | Coverley | |
| 3,161,229 | A | | 12/1964 | Sanders | |
| 3,352,446 | A | | 11/1967 | Anderson et al. | |
| 3,425,162 | A | | 2/1969 | Halpern | |
| 3,694,962 | A | | 10/1972 | McDonald et al. | |
| 3,734,238 | A | * | 5/1973 | Secresty et al. | 187/400 |
| 3,747,275 | A | | 7/1973 | May et al. | |
| 4,114,901 | A | | 9/1978 | Pot | |

(Continued)

FOREIGN PATENT DOCUMENTS

EP 0418510 A1 3/1991

(Continued)

*Primary Examiner* — Michael R Mansen
*Assistant Examiner* — Stefan Kruer
(74) *Attorney, Agent, or Firm* — Fraser Clemens Martin & Miller LLC; William J. Clemens

(57) ABSTRACT

An apparatus for sealing a gap between an elevator car door and the associated car wall during car travel includes a sealing strip of resilient material with wall portions that can be reversibly stretched to bridge and seal the gap.

5 Claims, 2 Drawing Sheets

U.S. PATENT DOCUMENTS

| | | | | | |
|---|---|---|---|---|---|
| 4,150,509 | A | | 4/1979 | Knap | |
| 4,177,353 | A | | 12/1979 | McCormack | |
| 4,399,317 | A | * | 8/1983 | Van Dyk, Jr. | 174/364 |
| 4,441,278 | A | | 4/1984 | Covey, III | |
| 4,665,653 | A | | 5/1987 | Franz et al. | |
| 4,702,038 | A | * | 10/1987 | Frey | 49/478.1 |
| 4,706,413 | A | | 11/1987 | James | |
| 4,761,917 | A | | 8/1988 | Knecht et al. | |
| 5,083,639 | A | | 1/1992 | Kappeler | |
| 5,085,293 | A | | 2/1992 | Aime | |
| 5,131,504 | A | | 7/1992 | Yoo et al. | |
| 5,209,498 | A | | 5/1993 | Colin | |
| 5,702,533 | A | * | 12/1997 | Mundt et al. | 118/733 |
| 5,975,661 | A | * | 11/1999 | Jeziorowski et al. | 312/296 |
| 6,485,029 | B1 | | 11/2002 | Moody et al. | |

FOREIGN PATENT DOCUMENTS

| | | | |
|---|---|---|---|
| EP | 0665183 | A2 | 8/1995 |
| JP | 04129990 | A | 4/1992 |
| JP | 08296377 | A | 11/1996 |
| JP | 10077186 | A | 3/1998 |
| JP | 2001294388 | A | 10/2001 |

* cited by examiner

DEVICE FOR SEALING A GAP BETWEEN CAR DOOR AND CAR WALL IN AN ELEVATOR CAR

CROSS-REFERENCE TO RELATED APPLICATIONS

This application is a divisional application of the U.S. patent application Ser. No. 10/730,591 filed Dec. 8, 2003 and now abandoned.

BACKGROUND OF THE INVENTION

The present invention relates to a device for sealing a gap between a car door and a wall of an elevator car.

In high-speed elevator cars the problem exists of sound insulation, because with increasing travel speed the travel and air noises produced in the shaft progressively increase, penetrate through every opening into the car interior and thus reduce travel comfort. Usual sound insulation with insulating material fillings in double-walled walls and doors, as well as quietly operating ventilation systems, are capable of achieving, in conjunction with vibration damping devices, an appropriate effect. However, acoustic experiments show that the smallest openings admit a considerable amount of sound. With respect to a door this means that a door gap of at least one percent of the entire door opening cross-section lets through a third towards a half the volume of sound, which is generated outside this door, to the other side, thus into the car interior. In the case of an automatic car door a number of such passages in the form of small gaps between moved and fixed parts is essential. These have to be present in order to avoid direct frictional contact. Such gaps are present at the following locations: between a door threshold and lower door panel edges, laterally between a door panel surface and entrance side posts, between two door panels in the case of telescopic doors and between an entrance header and a door panel upper part. The problem can be partly solved by working with tight tolerances and very precise production and assembly in order to reduce these gaps to a minimal dimension. This is an expensive method and not satisfactory in effect.

It is shown in the U.S. Pat. No. 3,425,162 that this problem is not usually given any consideration and consequently these gaps are not sealed at all. In FIGS. 1 to 5 of this patent specification the large passages for sound are readily recognizable at the locations mentioned above.

European patent EP 0 418 510 relates to a device for door sealing relative to sound in the case of elevator cars with automatic doors. These doors normally have small gaps between a door post and a door panel, a header and the door panel, an inner door panel and an outer door panel in the case of telescopic doors and between a door panel underside and a door threshold in order to avoid contact between moved and fixed parts during door movements. For sealing and covering these gaps there are present at the door panels, in the closed state of the door, vertical post seals closing a gap, sliding header seals on the upper side of the door panel, threshold seals in the door threshold and vertical door edge seals at the front edges of the door panel. These seals close off all gaps in an encircling manner when the door is closed and thus largely prevent penetration of sound from noises mechanically generated outside the car.

A disadvantage of this known equipment resides in the substantial mechanical outlay and the large production costs connected therewith. A further disadvantage is the high expenditures on adjustment and maintenance operations.

SUMMARY OF THE INVENTION

The present invention has the object of creating a device which does not have the stated disadvantages and substantially eliminates gaps between the car door and the car wall. In particular, there shall be created a sealing device with simple construction that operates independently of the door movement.

According to the present invention, a device for sealing a gap between the car door and the car wall of a elevator car during car travel comprises a sealing strip having at least one wall, which wall can be reversibly stretched in front of the gap.

The advantages achieved by the present invention are substantially to be seen in that through stretching the wall the different gaps when the car door is closed are no longer present or no longer have a disadvantageous effect and that a corresponding device can, if need be, still be subsequently installed. Advantageously, the sealing strip is activated only during travel and the wall is stretched in front of the gap.

Advantageously the sealing strip is a resilient hollow body, which hollow body can be loaded by compressed air and/or vacuum. The advantages achieved by this embodiment consist in that the seal is actively sealed only in the closed state, that it is free of contact during door movement, that it is in engagement only during travel (if need be, only from a specific speed) and that it thus has no influence on the door movement, the closing process or the locking of the door.

According to a second embodiment the sealing strip advantageously comprises iron strips and at least one electromagnetic, which is electrically activated. The advantages achieved by this embodiment are that due to the simple construction of the sealing device large savings in technical outlay are achieved and that due to the simple construction there is ensured a minimum susceptibility to fault. A further advantage consists in that due to the independence from the door motion a more rapid mode of operation of the sealing device is possible. A further advantage consists in that the effectiveness of the sealing device is substantially improved.

The present invention resolves a long-standing prejudice of the elevator expert world, according to which no additional components are to be arranged at the elevator car in order to save weight and costs. In this specific case, however, hollow bodies or electromagnets are arranged around the car opening of an elevator car. Moreover, compressed air lines or vacuum lines are required. It has unexpectedly proved that these components are light and economic and enable a significant improvement in travel comfort and a noticeable simplification of the mechanical structures for sound insulation in elevator cars.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
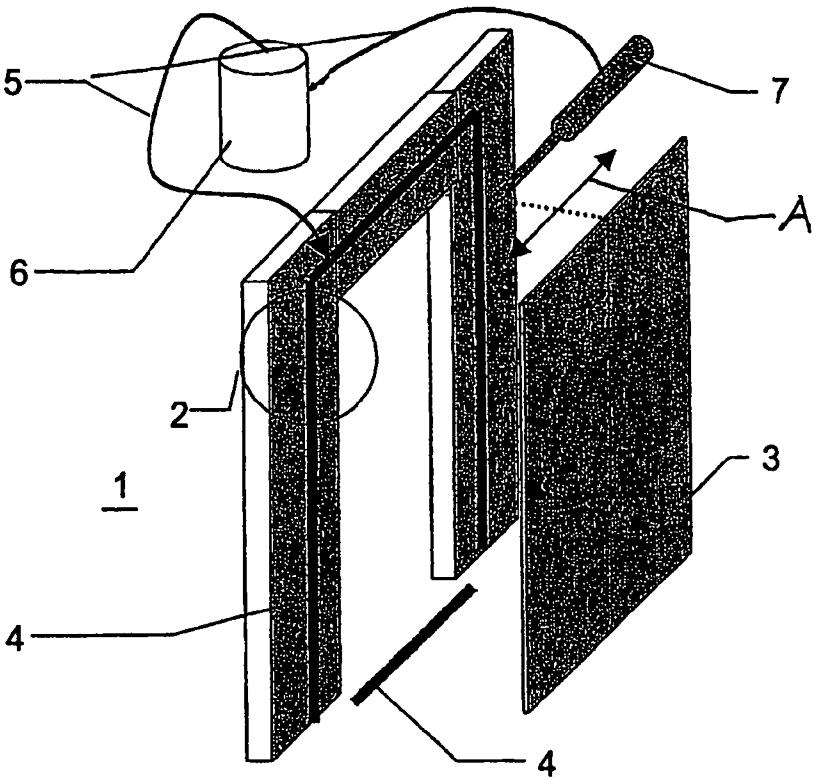
FIG. 1 is a schematic perspective view of an elevator entrance/exit with a pneumatic seal according to the present invention.
Figure 2:
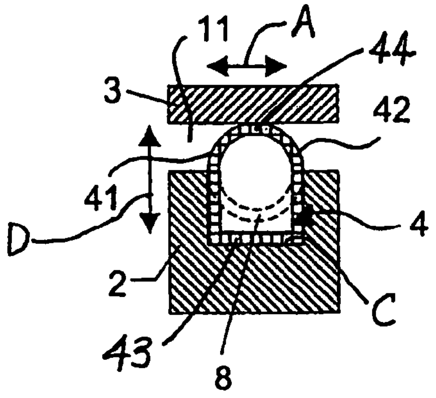
FIG. 2 is a schematic cross-sectional view of the sealing strip shown in FIG. 1 in the relieved and actuated states.

As shown in FIGS. 1 and 2, an elevator car 1 has a car wall denoted by 2 and an associated car door denoted by 3. The door 3 moves along a path parallel to the wall 2 as shown by an arrow A to open and close a door opening B formed in the wall. A sealing strip 4 made of resilient material is arranged around the car door opening B. The sealing strip 4 consists of an upper part and a lower part (in the threshold), which have a generally annular cross-section in a relieved state as illustrated in FIG. 2 by dashed lines. The sealing strip 4 consists of a hollow body 8 that is retained in a groove C formed in a surface of the wall 2 facing the door 3. When the sealing strip 4 is in an actuated state, as shown in solid lines in FIG. 2, it resiliently expands in a balloon-like manner to form a first wall portion 41 and a parallel second wall 42 sealingly contacting opposing walls of the groove C. A third wall portion 43 sealingly contacts a bottom wall of the groove C and a fourth wall portion 44 sealingly contacts the facing surface of the door 3. The pressure necessary for stretching the hollow body 8 is generated by a pressure source 7 by way of air lines 5 and a pressure container 6 connected to the sealing strip 4. The compressed air feed is carried out by way of, for example, any of the following four variants:

1. A compressor, with the advantage of rapid filling of the hollow body 8 and with the disadvantage of noise.

2. A mechanical pump, which is operated by the door movement, with the advantage of quiet running and that no additional motor or drive is necessary. The forces for the door drive/closing force limiter are used so that for each door movement only one pump volume for filling the pressure reservoir is available and the reservoir is filled only by way of door movements.

3. Utilization of the pressure difference before the car starts and after the car is moving in the case of high-speed cars or underpressure between the car and the shaft doors.

4. Double-acting piston, which is actuated by the acceleration forces during starting off and braking.

In the embodiment illustrated in FIG. 1, the air compressed by the pressure source 7 first passes into the pressure reservoir 6 and then into the sealing strip 4. In another embodiment of the seal according to the present invention, the reservoir 6 can be eliminated and the compressed air or vacuum source 7 can be connected directly to the sealing strip 4 by the air line 5.

The hollow body 8 shown in FIG. 2 is dimensioned in such a manner that in the pressure-free relieved state a spacing from the door 3, which is necessary for free opening and closing of the car doors, is ensured. The compressed air flowing in the lines 5 flows by way of an opening, which is not illustrated, into the interior of the hollow body 8 during elevator travel and expands the resilient hollow body 8 according to FIG. 2 in a balloon-like manner so that it is pressed against the car door 3 and in that case seals off a gap 11 between the car door 3 and the car wall 2 in a pressure-tight and noise-tight manner. As indicated by an arrow D, the gap 11 can vary in dimension and the resilient property of the sealing strip 4 maintains the fourth wall portion 44 in contact with the door 3.

When the elevator car 1 stops at the stopping point the hollow body 8 is relieved and the resilience of the material of the hollow body 8 returns the wall portions to the initial shape according to the dashed lines in FIG. 2. The gap 11 between the car door 3 and car wall 2 is thereby unsealed again, which makes possible a faultless and contact-free motion of the door panel during door opening and closing.

As soon as the elevator car 1 is moved into the stopping point, the elevator control (not shown) electromagnetically brings the directional valves (not shown) from a first setting, which loads the sealing strip 4 with the feed pressure, to a second setting, which relieves the air pressure in the sealing strip 4. The elevator control releases the door opening and closing of the elevator car 1 at the stopping point only when all pressure switches (not shown) report completion of the relief.

In a further embodiment, instead of relief to the atmosphere a sealing strip 4 can be evacuated. In this case the outlet opening of the directional valves (not shown) is to be connected with the suction duct of a vacuum source (not shown). The evacuation produces a more rapid departure readiness of the sealing strip 4.

Figure 3:
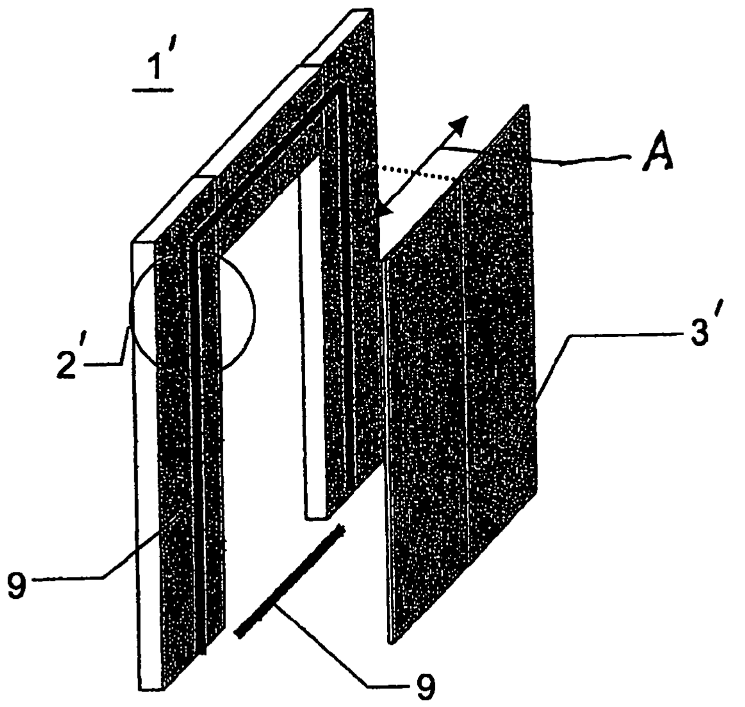
FIG. 3 is a view similar to FIG. 1 showing an electromagnetic seal according to a second embodiment of the present invention.

A further advantageous embodiment of the seal according to the present invention is shown in FIG. 3, wherein a sealing strip 4' is operated not pneumatically by compressed air, but electromagnetically by an electromagnet 9.

In this embodiment the flexible sealing strip 4' is arranged not at the car wall 2', but at an edge of the car door 3'. Iron strips 10 are embedded in the sealing strip 4' and interact with the rod-shaped electromagnet 9 arranged in a groove E formed in the car door frame when the car doors 3' are in the closed position.

Figure 4A:
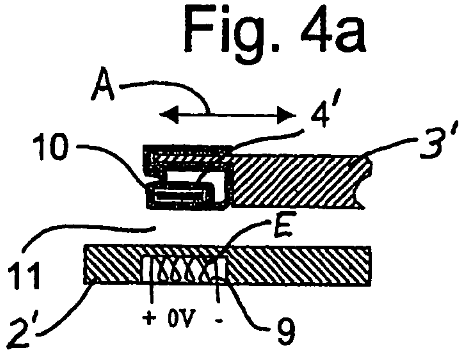
FIG. 4*a* is a schematic cross-sectional view of the sealing strip shown in FIG. 3 in the relieved state.
Figure 4B:
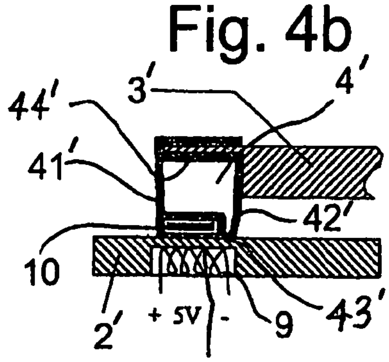
FIG. 4*b* is a view similar to FIG. 4*a*, but with the sealing strip in the actuated state.

When the car doors 3' are closed and upon movement away of the elevator car 1', the electromagnet 9 is activated by an electrical voltage so that attractive electromagnetic forces arise between the electromagnet 9 and the iron strips 10. The sealing strip 4' is thereby drawn into sealing closure against the facing surface of the car wall 2'. FIG. 4*b* shows the sealing strip 4' in the activated setting when a voltage is applied to the electromagnet 9, the car doors 3' are closed and the elevator car 1' moves. In this actuated state, the third wall portion 43' contacts the car wall 2'. FIG. 4*a* shows the sealing strip 4' in the relieved or deactivated setting when no voltage is applied to the electromagnet 9 and the car doors 3' are closed or open while the elevator car 1' stands at the floor stop. Like the sealing strip 4, the sealing strip 4'is a resilient hollow body.

The rod-shaped electromagnet can be replaced by several individual spaced electromagnets. Due to the iron strip 10 in the sealing strip 4' the sealing strip will bear tightly with sufficient stiffness over the entire length. The electromagnet 9 can also be seated in the door 3' and the sealing strip 4' in the car wall 2'. The control of the electromagnet 9 is advantageously carried out by way of the door control (not shown).

With knowledge of the present invention numerous possibilities of variation of the illustrated embodiments are available to the expert. Thus, for example, it is also possible to use a piezoelectric element instead of electromagnet in order to electrically operate the sealing strip 4'.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A device for sealing a gap between facing surfaces of an elevator car door and an adjacent car wall of an elevator car during travel comprising:

a sealing strip adapted to be mounted on one of the car door and the car wall, said sealing strip having a movable wall portion for sealing the gap and at least one iron strip, said at least one iron strip being embedded in said sealing strip; and actuator means for selectively moving said wall portion across the gap and into contact with the facing surface of another one of the car door and the car wall whereby the gap is sealed, said actuator means including at least one electromagnet adapted to be mounted on the another one of the car door and the car body and being selectively actuatable for magnetically attracting said at least one iron strip, wherein the elevator car door opens and closes parallel to the car wall, the gap being defined by a distance between the facing surfaces of the elevator car door and the car wall, the distance being substantially constant as the elevator car door opens and closes, the movable wall portion moving at least a remaining portion of the distance between the elevator car door and the car wall when the iron strip is magnetically attracted by the at least one electromagnet to seal the gap.

2. The device according to claim 1 wherein said at least one electromagnet is mounted in a car door frame of the car wall.

3. A method of sealing a gap between facing surfaces of an elevator car door and an adjacent car wall of an elevator car during travel comprising the steps of:

a) providing a sealing strip having a hollow interior and at least one movable wall with at least one iron strip embedded in the movable wall;

b) mounting the sealing strip on one of the car door and the car wall, the car door and the car wall being separated by a gap;

c) providing an actuator for moving the movable wall; and d) operating the actuator to move the at least one movable wall to seal the gap by magnetically attracting the at least one movable strip embedded in the at least one movable wall, wherein the elevator car door opens and closes parallel to the car wall, the gap being defined by a distance between the facing surfaces of the elevator car door and the car wall, the distance being substantially constant as the elevator car door opens and closes, the movable wall portion moving at least a remaining portion of the distance between the elevator car door and the car wall when the iron strip is magnetically attracted by the at least one electromagnet to seal the gap.

4. An elevator car comprising:

a car wall having a door opening formed therein;

a car door spaced from said car wall by a gap between facing surfaces of said car door and said car wall and being movably attached to the car for opening and closing said door opening;

a sealing strip mounted on one of said car door and said car wall, said sealing strip having a movable wall portion facing said gap and including at least one iron strip, said at least one iron strip is embedded in said sealing strip; and actuator means for selectively moving said movable wall to seal said gap, said actuator means including at least one electromagnet adapted to be mounted on the another one of said car door and said car body and being selectively actuatable for magnetically attracting said at least one iron strip, wherein the elevator car door opens and closes parallel to the car wall, the gap being defined by a distance between the facing surfaces of the elevator car door and the car wall, the distance being substantially constant as the elevator car door opens and closes, the movable wall portion moving at least a remaining portion of the distance between the elevator car door and the car wall when the iron strip is magnetically attracted by the at least one electromagnet to seal the gap.

5. The device according to claim 4 wherein said at least one electromagnetic is mounted in a car door frame of said car wall.

* * * * *